US012675295B2

(12) United States Patent
Savir et al.

(10) Patent No.: US 12,675,295 B2
(45) Date of Patent: Jul. 7, 2026

(54) SYSTEM AND METHOD FOR DISTRIBUTED FORWARDING LOGIC FOR CYCLIC DATA-PIPELINE COHERENCY

(71) Applicant: Microsoft Technology Licensing, LLC, Redmond, WA (US)

(72) Inventors: Gil Savir, Haifa (IL); Idan Regev, Adamit (IL); Izik Ohev-Zion, Haifa (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/424,989

(22) Filed: Jan. 29, 2024

(65) Prior Publication Data

US 2025/0245014 A1 Jul. 31, 2025

(51) Int. Cl.
*G06F 9/38* (2018.01)
*G06F 15/76* (2006.01)
*G06F 15/78* (2006.01)

(52) U.S. Cl.
CPC .......... *G06F 9/3867* (2013.01); *G06F 9/3826* (2013.01); *G06F 9/3838* (2013.01); *G06F 15/7867* (2013.01); *G06F 2015/763* (2013.01); *G06F 2015/768* (2013.01)

(58) Field of Classification Search
CPC .... G06F 9/3867; G06F 9/3826; G06F 9/3838; G06F 15/7867; G06F 2015/763; G06F 2015/768
See application file for complete search history.

(56) References Cited

U.S. PATENT DOCUMENTS

| 9,600,288 B1* | 3/2017 | Potter | G06F 9/3824 |
| 2006/0149930 A1* | 7/2006 | Murakami | G06F 9/3867 |
| | | | 712/218 |
| 2008/0028193 A1* | 1/2008 | Dhodapkar | G06F 9/3826 |
| | | | 712/219 |
| 2014/0189316 A1* | 7/2014 | Govindu | G06F 9/3826 |
| | | | 712/220 |
| 2017/0212764 A1* | 7/2017 | Lyberis | G06F 9/30032 |
| 2020/0117457 A1* | 4/2020 | Walters | G06F 9/3836 |
| 2023/0315446 A1* | 10/2023 | Oshiyama | G06F 9/3867 |
| | | | 712/221 |

\* cited by examiner

*Primary Examiner* — Shawn Doman

(57) ABSTRACT

A method, computer program product, and computing system for processing data using a plurality of stages of a data processing pipeline. A data modification stage is identified in the plurality of stages. Modified data is forwarded from the data modification stage to each of the other stages of the plurality of stages. At a respective stage in the plurality of stages, an address of output data received from a previous stage relative to the respective stage is compared with an address of the modified data. In response to determining that the address of the output data from the previous stage is the same as the address of the modified data, the modified data is processed in the respective stage of the data processing pipeline.

20 Claims, 6 Drawing Sheets

10 processing data using a plurality of stages of a data processing pipeline 100

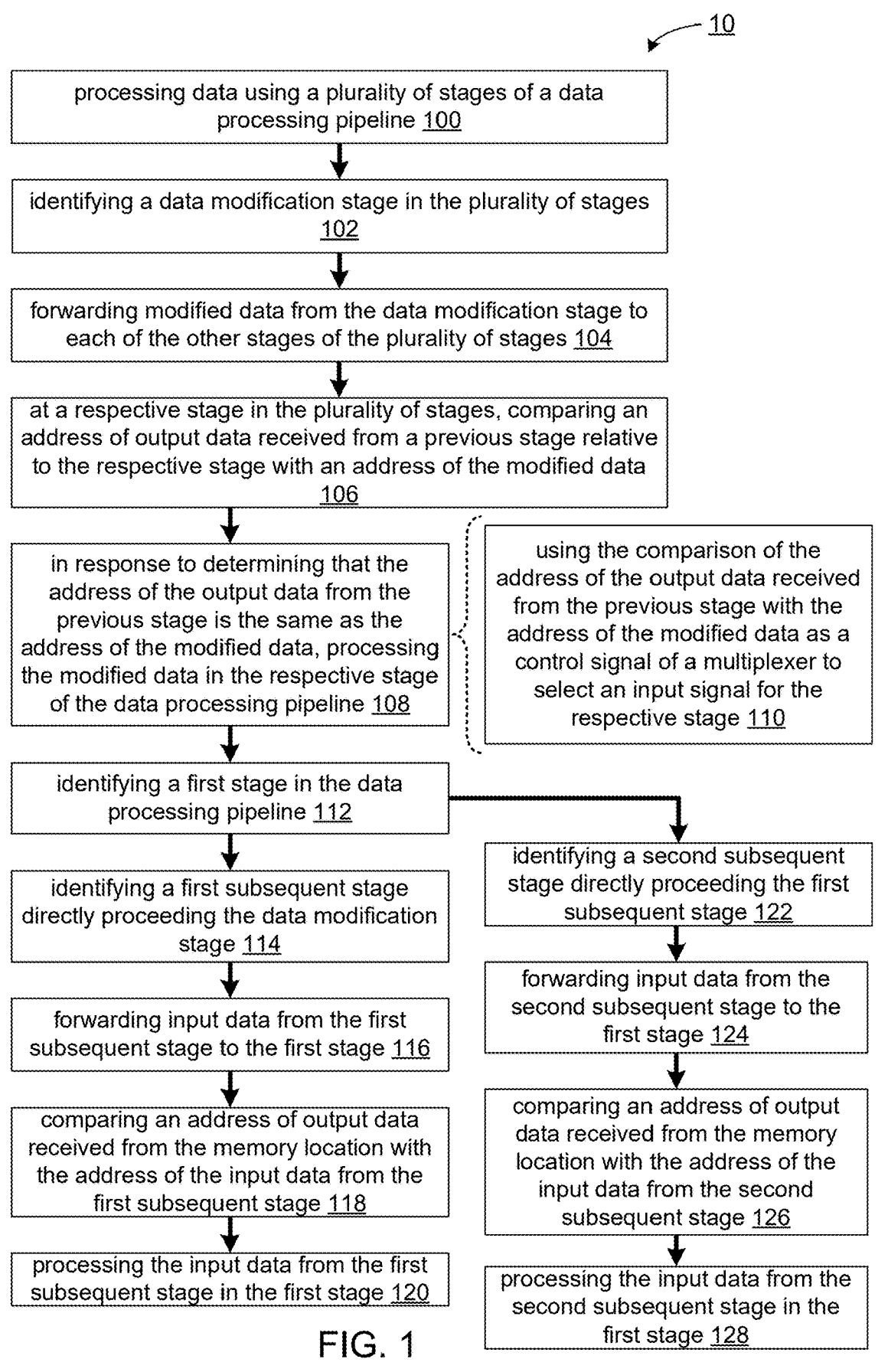

↓ identifying a data modification stage in the plurality of stages 102

↓ forwarding modified data from the data modification stage to each of the other stages of the plurality of stages 104

↓ at a respective stage in the plurality of stages, comparing an address of output data received from a previous stage relative to the respective stage with an address of the modified data 106

↓ in response to determining that the address of the output data from the previous stage is the same as the address of the modified data, processing the modified data in the respective stage of the data processing pipeline 108 using the comparison of the address of the output data received from the previous stage with the address of the modified data as a control signal of a multiplexer to select an input signal for the respective stage 110

↓ identifying a first stage in the data processing pipeline 112

↓ identifying a first subsequent stage directly proceeding the data modification stage 114

↓ forwarding input data from the first subsequent stage to the first stage 116

↓ comparing an address of output data received from the memory location with the address of the input data from the first subsequent stage 118

↓ processing the input data from the first subsequent stage in the first stage 120 identifying a second subsequent stage directly proceeding the first subsequent stage 122

↓ forwarding input data from the second subsequent stage to the first stage 124

↓ comparing an address of output data received from the memory location with the address of the input data from the second subsequent stage 126

↓ processing the input data from the second subsequent stage in the first stage 128

FIG. 1

SYSTEM AND METHOD FOR DISTRIBUTED FORWARDING LOGIC FOR CYCLIC DATA-PIPELINE COHERENCY

BACKGROUND

Typical hardware digital logic design is composed of clocked digital inputs, combinational logic performing the required calculations, and digital outputs. When the combinational logic is complex, it is divided into several clock-cycles in order to maintain digital signal integrity, stemming from the physical limitations of the chip's building blocks. The resulting data-path is also referred to as "data pipeline", or just "pipeline", where each chunk of the combinational logic stores an intermediate result in registers, and the intermediate result is fed into its consecutive combinational logic chunk.

There is also a context memory or cache memory involved, where data required for the pipeline's calculations is fetched at the pipeline's starting point. The context may be comprised of multiple data items/fields. Some of the context's fields may be written back to the context memory, with an updated value (e.g., using the pipeline feedback). The updated value is required for the next calculation that is sent into the data pipeline using the same context (i.e., the same memory address).

Pipeline feedback configurations are used for various types of read and write operations involving hardware components. For example, a read-modify-write operation where the read and the write operations are performed from and to the same memory location, involve data processing pipeline feedback. When the "modify" operation is simple, and requires a single clock-cycle, keeping the memory content, and the input value(s) to the "modify" operation coherent is straightforward. However, on more complex read-modify-write implementations, multiple clock-cycles may be required from the moment a memory content is read until it is modified. Also, multiple clock-cycles may be required from the modification logic until the actual write operation to the memory.

For example, a hardware implementation of a tokens-bucket algorithm (e.g., for packetized traffic rate-limiting) involves a few different fields in each memory location. Each field value is required during different clock-cycles in the pipeline, and two fields are also being modified (each on different clock-cycles in the pipeline) and written back to the memory.

Such pipeline implementations must deal with data hazards resulting from a read request for a memory location that was already read in a previous clock-cycle, and its modified fields are still in the pipeline, and therefore, were not updated in the memory location.

BRIEF DESCRIPTION OF THE DRAWINGS

FIG. 1 is a flow chart of one implementation of a distributed forwarding process;

Like reference symbols in the various drawings indicate like elements.

DETAILED DESCRIPTION OF THE EMBODIMENTS

Figure 2:
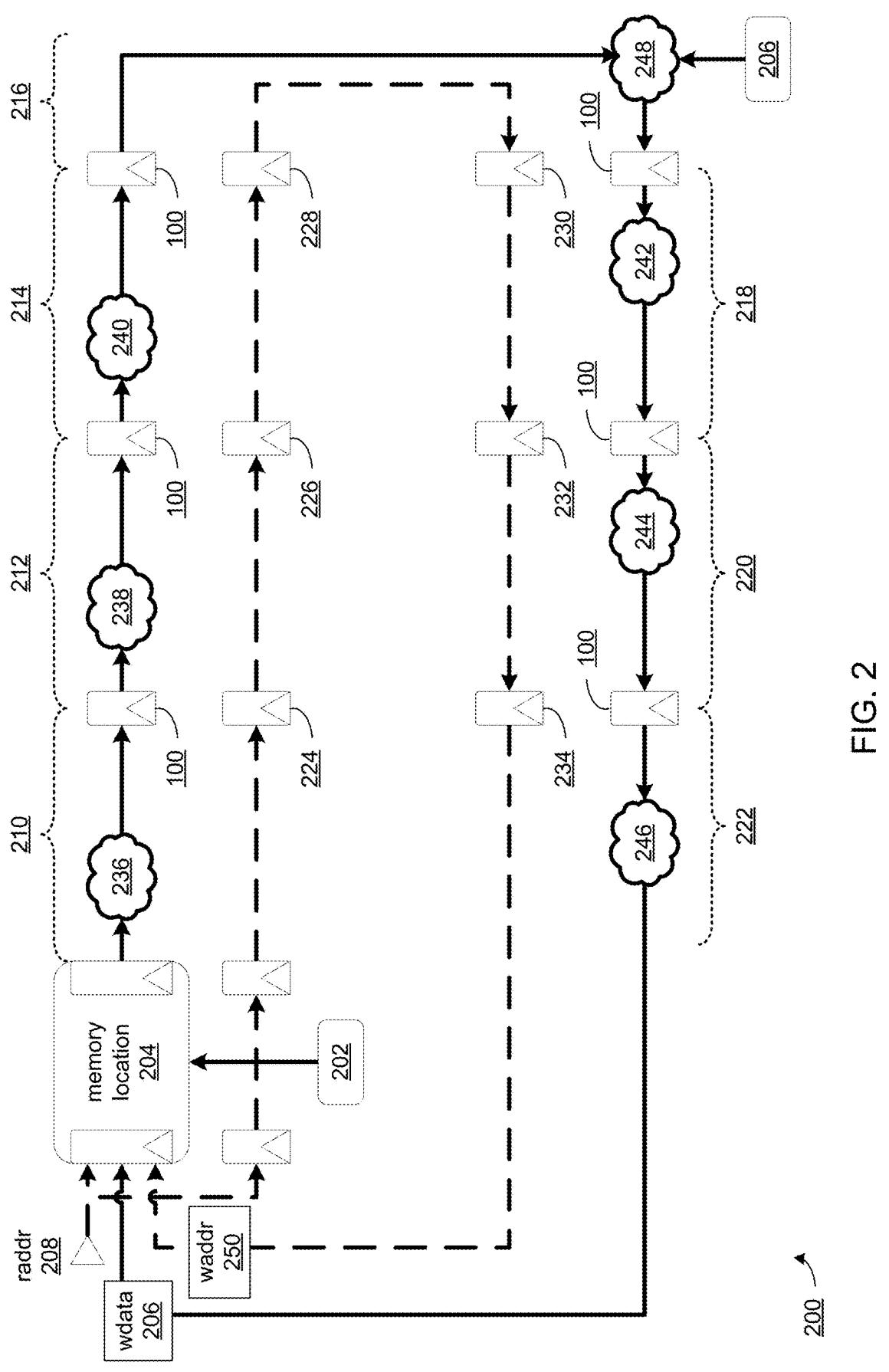
FIGS. 2-4 are diagrammatic views of a data processing pipeline according to various example implementations of the distributed forwarding process of FIG. 1

Implementations of the present disclosure enable the forwarding of logic in a distributed manner along pipeline stages instead of concentrating it in single pipeline stage. As discussed above, digital logic design is generally composed of clocked digital inputs, combinational logic performing the required calculations, and digital outputs. When the combinational logic is complex, it is divided into several clock-cycles in order to maintain digital signal integrity. The resulting data-path is also referred to as the "data pipeline" where each portion of the combinational logic stores an intermediate result in registers, and the intermediate result is fed into its consecutive combinational logic chunk. When an operation is simple, and requires a single clock-cycle, keeping the memory content and the input value(s) to the operation coherent is straightforward. However, on more complex read-modify-write implementations, multiple clock-cycles may be required from the moment a memory content is read until it is modified. This can introduce inconsistencies resulting from a read request for a memory location that was already read in a previous clock-cycle, and its modified fields are still in the pipeline, and therefore, were not updated in the memory location.

Other solutions for resolving this data consistency issue involve techniques that are similar to operand forwarding. For example and for complex read-modify-write pipelines, the memory location of the input to the modify cycle of a certain field has to be compared to all memory locations of previous pipeline stages, to locate a more recent read from the same memory location to be forwarded as an alternative input. Furthermore, memory locations of pipeline stages between the modify stage and the write-to-memory stage are also scanned in order to locate recent modifications to be forwarded as alternative input. This approach results with considerable large combinational logic being added to the modify pipeline stage(s) which reduces timing performance of this circuitry (lowering achievable clock rate). This approach is also not scalable, since longer pipelines require deeper forwarding logic, which further degrades timing performance.

As will be described in greater detail below, implementations of the present disclosure process data using a plurality of stages of a data processing pipeline. A data modification stage is identified in the plurality of stages. Modified data is forwarded from the data modification stage to each of the other stages of the plurality of stages. At a respective stage in the plurality of stages, an address of output data received from a previous stage relative to the respective stage is compared with an address of the modified data. In response to determining that the address of the output data from the previous stage is the same as the address of the modified data, the modified data is processed in the respective stage of the data processing pipeline.

The distributed forwarding process of the present disclosure distributes the forwarding logic along each of the pipeline stages, resulting in improved timing performance. For example, instead of forwarding the most recent calculation from all pipeline stages into the data processing pipeline stage where the data is modified, the distributed forwarding process of the present disclosure forwards the most recent calculation result into all stages that carry the data associated with the same address. In this manner, the long critical path of the priority selector is broken and distributed over all the data processing pipeline stages.

Using implementations of the present disclosure to distribute the forwarding logic along the pipeline stages, results in improved timing performance. This approach is also scalable, as adding more pipeline stages does not degrade the timing performance. These two important advantages are achieved with virtually no penalty in resources utilization and require less hardware logic to implement.

The details of one or more implementations are set forth in the accompanying drawings and the description below. Other features and advantages will become apparent from the description, the drawings, and the claims.

The Distributed Forwarding Process:

Referring to FIGS. 1-5, distributed forwarding process 10 processes 100 data using a plurality of stages of a data processing pipeline. A data modification stage is identified 102 in the plurality of stages. Modified data is forwarded 104 from the data modification stage to each of the other stages of the plurality of stages. At a respective stage in the plurality of stages, an address of output data received from a previous stage relative to the respective stage is compared 106 with an address of the modified data. In response to determining that the address of the output data from the previous stage is the same as the address of the modified data, the modified data is processed 108 in the respective stage of the data processing pipeline.

In some implementations, distributed forwarding process 10 processes 100 data using a plurality of stages of a data processing pipeline. As discussed above, typical hardware logic design is composed of clocked digital inputs, combinational logic performing calculations, and digital outputs. When the combinational logic is complex, it is divided into several clock-cycles or stages in order to maintain digital signal integrity, stemming from the physical limitations of the chip's building locks. The resulting data-path is also referred to as "data processing pipeline" where each stage of the combinational logic stores intermediate result in registers, and the intermediate result is fed into its consecutive combinational logic stage.

Referring also to FIG. 2 and in some implementations, a data processing pipeline (e.g., data processing pipeline 200) begins with reading the data (e.g., data 202) from a memory location (e.g., memory location 204) and ends with writing the modified data (e.g., modified data 206) to memory location 204. Using a read address (e.g., raddr 208), data 202 is read from memory location 204 and provided to a first sequential stage. As shown in FIG. 2, data processing pipeline 200 includes a plurality of sequential stages (e.g., stages 210, 212, 214, 216, 218, 220, 222). Each stage has a register (e.g., registers 224, 226, 228, 230, 232, 234) to hold the write address for the data. Stages 210, 212, 214, 218, 220, 222 include combinational logic that does not modify a particular portion or field of data (e.g., non-modifying combinational logic 236, 238, 240, 242, 244, 246) while stage 216 includes combinational logic that does modify the particular portion or field of data (e.g., modifying combinational logic 248 that generates modified data 206). The input of each stage is processed by the combinational logic associated with the stage and then output to a proceeding stage for subsequent processing. At the end of data processing pipeline 200, the output (e.g., modified data 206) of the last stage (e.g., stage 222) is written to the memory location (e.g., memory location 204). Using a write address (e.g., waddr 250), the modified data (e.g., also shown in FIG. 2 as "wdata 202") is written to memory location 204.

In some implementations, the data processing pipeline is executed using a computing device. In one example, the data processing pipeline is executed using a field programmable gate array (FPGA). An FPGA is a type of integrated circuit that can be programmed or reprogrammed after manufacturing. In another example, the data processing pipeline is executed using an application-specific integrated circuit (ASIC). An ASIC is an integrated circuit (IC) chip customized for a particular use, rather than intended for general-purpose use. Accordingly, distributed forwarding process 10 is able to execute data processing pipeline 200 using ASICs that are custom-designed, fixed-function devices optimized for a specific application and/or using FPGAs that can be configured to implement various digital circuits and functions.

As discussed above, conventional approaches to resolving the issue of reading old, pre-modified data before the modified data is written back to the memory location, involve techniques that are similar to operand forwarding. For example and for complex read-modify-write pipelines, the memory location of the input to the modify cycle of a certain field has to be compared to all memory locations of previous pipeline stages, to locate a more recent read from the same memory location to be forwarded as an alternative input. Furthermore, memory locations of pipeline stages between the modify stage and the write-to-memory stage are also scanned in order to locate recent modifications to be forwarded as alternative input. This approach results with considerable large combinational logic being added to the modify pipeline stage(s) which reduces timing performance of this circuitry (lowering achievable clock rate). This approach is also not scalable, since longer pipelines require deeper forwarding logic, which further degrades timing performance.

For example, this process employs a selection multiplexer logic as a long "if-else" comparator chain since the most recent instance of the modified data must be selected. In one example, suppose a data processing pipeline has nine stages with four kilobyte entries in the memory. Each stage would involve a twelve-bit comparator to perform address comparison. In this example, the output of each of the eight twelve-bit comparators (e.g., one comparator for each non-data modification stage) is provided to a respective multiplexer to form an eight-multiplexer selector chain. This selector has a critical path traversing through at least one comparator and each of the eight multiplexers of the multiplexer chain. Since each of these components (comparator/multiplexer) incurs a latency of two logic-levels, the total latency in this example is eighteen logic-levels. Such latency is generally unacceptable for FPGA and many ASIC implementations. As will be discussed in greater detail below, distributed forwarding process 10 distributes the forwarding logic along each of the pipeline stages, resulting in improved timing performance. Accordingly, the long critical path of the priority selector is broken and distributed over all the data processing pipeline stages.

In some implementations, distributed forwarding process 10 identifies 102 a data modification stage in the plurality of stages. For example, data processing pipeline 200 includes a plurality of stages (e.g., stages 210, 212, 214, 216, 218, 220, 222) with one or more non-data modification stages (e.g., non-data modification stages 210, 212, 214, 218, 220, 222) which include combination logic (e.g., combinational logic 236, 238, 240, 242, 244, 246) that does not modify data 202. Data processing pipeline 200 includes a data modification stage (e.g., data modification stage 216) that modifies data 202 according to combination logic 248. To identify 102 data modification stage 216, distributed forwarding process 10 compares data 202 input to each stage and data 202 output from that stage. When a change is identified in the output, distributed forwarding process 10 identifies 102 that stage as a data modification stage.

Figure 3:
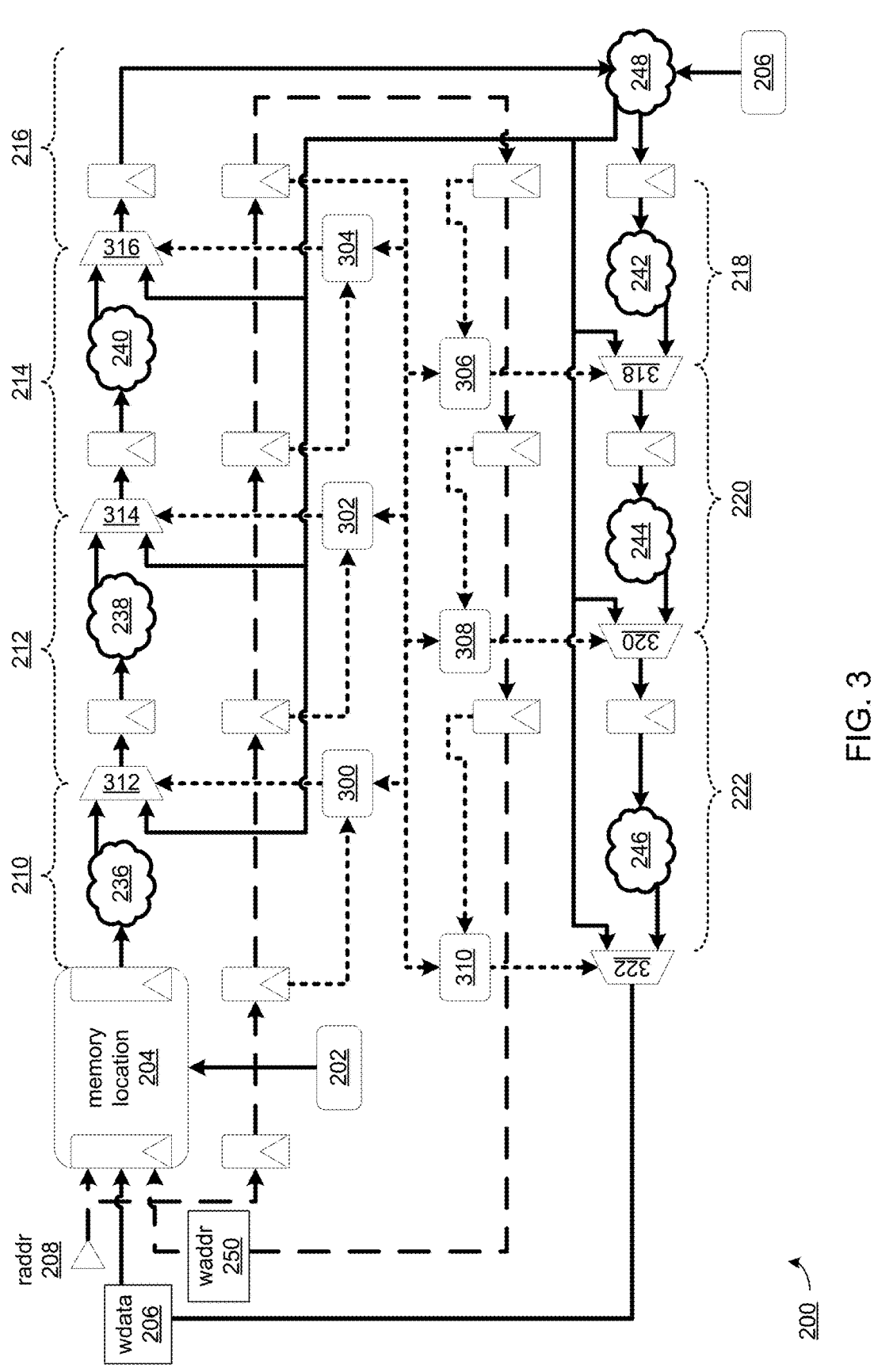

In some implementations, distributed forwarding process 10 forwards 104 modified data from the data modification stage to each of the other stages of the plurality of stages. Referring also to FIG. 3, distributed forwarding process 10 forwards 104 modified data 206 from data modification stage 216 to each of the other stages (e.g., stages 210, 212, 214, 218, 220, 222) by routing modified data 206 to each stage. As will be described in greater detail below, distributed forwarding process 10 forwards 104 modified data 206 to an input to a multiplexer preceding each stage. This is shown in FIG. 3 with the arrowed lines from combinational logic 248 to each of stages 210, 212, 214, 218, 220, 222.

In some implementations and at a respective stage in the plurality of stages, distributed forwarding process 10 compares 106 an address of output data received from a previous stage relative to the respective stage with an address of the modified data. For example and as shown in FIG. 3, each stage (e.g., 210, 212, 214, 218, 220, 222) includes a comparator (e.g., comparators 300, 302, 304, 306, 308, 310, respectively) that compares the address of the output data (e.g., the write address for writing the output data in memory location 204) received from a previous stage with the address of the modified data. Comparators 300, 302, 304, 306, 308, 310 are hardware and/or software modules that compare two inputs to determine if they are identical. In one example, each comparator outputs a binary "0" when the addresses are not identical and a binary "1" when the addresses are identical. Comparators 300, 302, 304, 306, 308, 310 receive the addresses for comparison from registers 224, 226, 228, 230, 232, 234, as depicted in FIG. 2, where register 228 provides the address of modified data 206.

In some implementations and in response to determining that the address of the output data from the previous stage is the same as the address of the modified data, distributed forwarding process 10 processes 108 the modified data in the respective stage of the data processing pipeline. For example, a subsequent stage of the data processing pipeline may use data 202 during its processing. However, assuming data 202 is modified at data modification stage 216, modified data 206 may not be written back to memory location 204 in time. As such, distributed forwarding process 10 forwards 104 modified data 206 to each subsequent stage (where subsequent includes stages between data modification stage 216 and memory location 204 and between memory location 204 and data modification stage 216). Distributed forwarding process 10 compares 106 an address of the output data from a previous stage with the address for modified data 206. When the address of the output data from the previous stage is identical to the address for modified data 206 as, distributed forwarding process 10 processes 108 modified data 206 instead of processing the original or un-modified data (e.g., data 202 read from memory location 204). In some implementations, processing 108 modified data 206 includes using modified data 206 in the combinational logic of a particular stage within data processing pipeline 200. In this manner, data processing pipeline 200 is able to include updates to data 202 from data modification stage 216 without requiring modified data 206 to be written to memory location 204 and without using expensive selection mechanisms concentrated in a single stage to select between modified data 206 and other data.

In some implementations, processing 108 the modified data in the respective stage of the data processing pipeline includes using 110 the comparison of the address of the output data received from the previous stage with the address of the modified data as a control signal of a multiplexer to select an input signal for the respective stage. For example, each non-modification stage (e.g., stages 210, 212, 214, 218, 220, 222) includes a multiplexer (e.g., multiplexers 312, 314, 316, 318, 320, 322, respectively) where the output of each comparator (e.g., comparators 300, 302, 304, 306, 308, 310) operates as the control signal for each multiplexer. In some implementations, the input signal of each stage is one of the output data from the previous stage and the modified data as determined by the multiplexer. For example, if the control signal from the multiplexer is a binary "0" (i.e., the address of the output data received from the previous stage and the address of the modified data are not the same), distributed forwarding process 10 provides the output data from the previous stage as the input data to the respective stage. In another example, if the control signal from the multiplexer is a binary "1" (i.e., the address of the output data received from the previous stage and the address of the modified data are the same), distributed forwarding process 10 provides modified data 206 that was forwarded to the stage as the input data to the respective stage.

Suppose that distributed forwarding process 10 generates modified data 206 after processing data 202 using data modification stage 216. Now suppose that at stage 220, distributed forwarding process 10 provides output data from stage 218 as one input to multiplexer 318 and modified data 206 as another input to multiplexer 318. Using comparator 306, distributed forwarding process 10 compares 106 the address of the output data received from stage 218 with the address of modified data 206. In this example, suppose that the addresses processed by comparator 306 are identical. Accordingly, the control signal of multiplexer 318 is a binary "1" causing the input signal to stage 220 to be modified data 206. In this manner, distributed forwarding process 10 processes 108 modified data 206 in stage 220 of data processing pipeline 200. In another example, suppose that the addresses processed by comparator 306 are not identical. Accordingly, the control signal of multiplexer 318 is a binary "0" causing the input signal to stage 220 to be the output data from stage 218. With this approach, distributed forwarding process 10 distributes the burden of processing forwarded modified data 206 to each stage of data processing pipeline 200.

Figure 4:
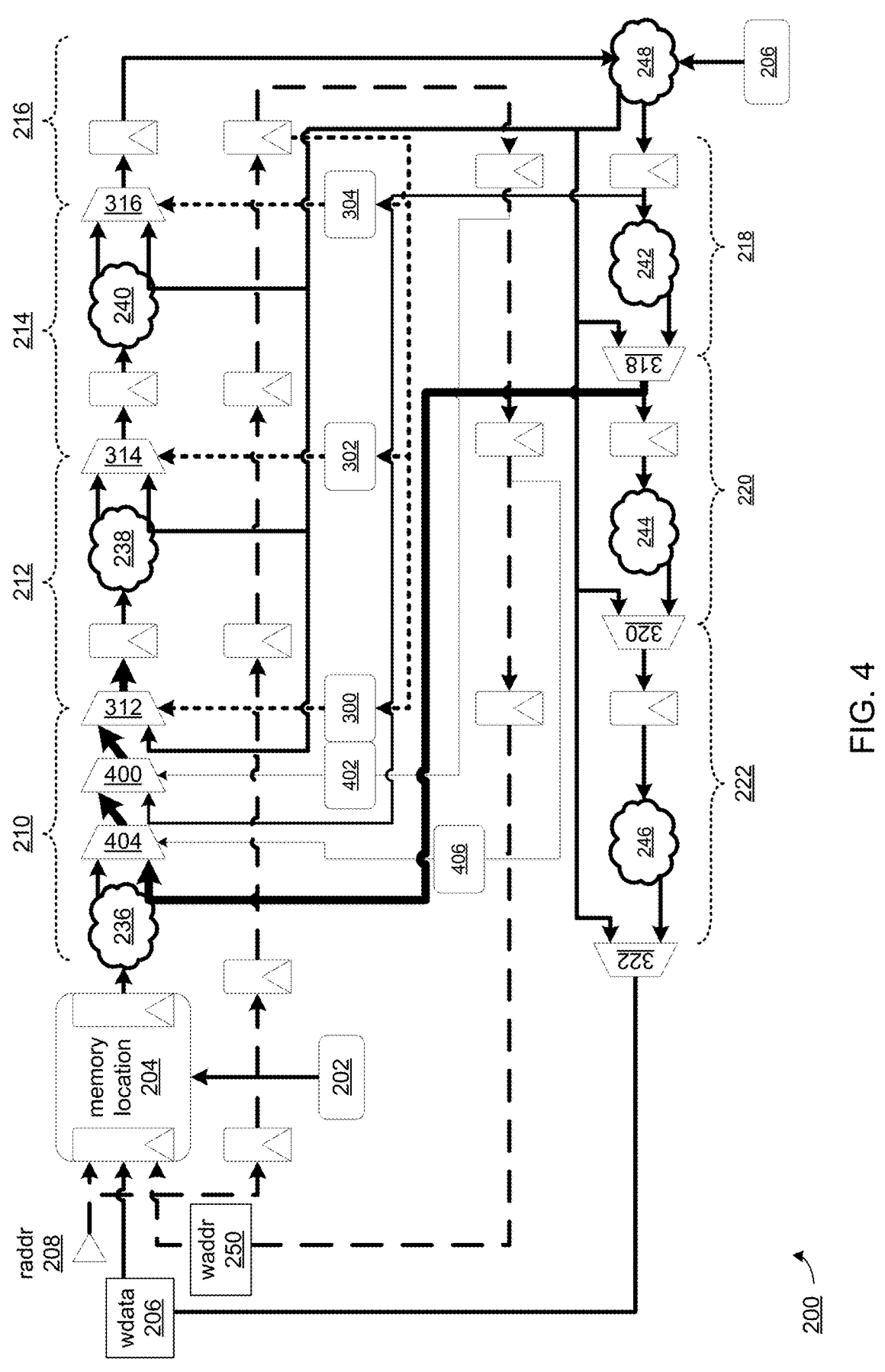

In some implementations and referring also to FIG. 4, distributed forwarding process 10 addresses a specific case where the modified data read from memory location 204 may be outdated, if its address was used for calculation in data modification stage 216 during the previous two clock cycles (i.e., any of the two). For example, this is because memory reads are two clock-cycles long, during which updated values cannot be forwarded into memory location 204. To alleviate this situation, distributed forwarding process 10 provides a short priority selector. For example and as shown in FIG. 4, this priority selector replaces the first stage data with a modified version, if it exists, by comparing the first stage address to an address from a first subsequent stage directly proceeding the data modification stage and to an address from a second subsequent stage directly proceeding the first subsequent stage.

In some implementations, distributed forwarding process 10 identifies 112 a first stage in the data processing pipeline. For example, distributed forwarding process 10 identifies 112 a first stage (e.g., stage 210) in data processing pipeline 200. As discussed above, due to the two clock cycles required to update memory location 204, modified data 206 may not be updated in time for first stage 210 to read modified data 206 from memory location 204. In some implementations, distributed forwarding process 10 identifies 114 a first subsequent stage directly proceeding the data modification stage. In this example, distributed forwarding process 10 identifies 114 stage 218 as the first subsequent stage directly proceeding data modification stage 216.

In some implementations, distributed forwarding process 10 forwards 116 input data from the first subsequent stage to the first stage. For example, distributed forwarding process 10 forwards 116 modified data 206 to multiplexer 400 from data modification stage 216 as discussed above and forwards the input data from stage 218 to multiplexer 400. In some implementations, distributed forwarding process 10 compares 118 an address of output data received from the memory location with the address of the input data from the first subsequent stage. For example and as discussed above, distributed forwarding process 10 uses comparator 402 to compare 118 the address of the output data received from memory location 204 with the address of the input data from stage 218.

In some implementations and in response to determining that the address of the output data from the memory location is the same as the address of the input data from the first subsequent stage, distributed forwarding process 10 processes 120 the input data from the first subsequent stage in the first stage. For example, when the address of the output data from the memory location is the same as the address of the input data from the first subsequent stage, data 202 has been modified but is not yet uploaded to memory location 204. Accordingly, comparator 402 provides a binary "1" as the control signal to multiplexer 400 such that multiplexer 400 provides the input data from stage 218 to stage 210 for processing. When the address of the output data from the memory location is not the same as the address of the input data from the first subsequent stage, comparator 402 provides a binary "0" as the control signal to multiplexer 400 such that multiplexer 400 provides the output data from memory location 204 to stage 210 for processing.

As discussed above, with two clock cycles required to update memory location 204, modified data 206 may not be updated in time for first stage 210 to read modified data 206 from memory location 204. In some implementations and in addition to identifying the first subsequent stage, distributed forwarding process 10 identifies 112 a second subsequent stage directly proceeding the first subsequent stage. For example, distributed forwarding process 10 identifies 112 stage 220 as the second subsequent stage directly proceeding the first subsequent stage (e.g., stage 218).

In some implementations, distributed forwarding process 10 forwards 124 input data from the second subsequent stage to the first stage. For example, distributed forwarding process 10 forwards 124 modified data 206 to multiplexer 404 from data modification stage 216 as discussed above and forwards 124 the input data from stage 220 to multiplexer 404. In some implementations, distributed forwarding process 10 compares 126 an address of output data received from the memory location with the address of the input data from the second subsequent stage. For example and as discussed above, distributed forwarding process 10 uses comparator 406 to compare 126 the address of the output data received from memory location 204 with the address of the input data from stage 220.

In some implementations and in response to determining that the address of the output data from the memory location is the same as the address of the input data from the second subsequent stage, distributed forwarding process 10 processes 128 the input data from the second subsequent stage in the first stage. For example, when the address of the output data from the memory location is the same as the address of the input data from the second subsequent stage, data 202 has been modified but is not yet uploaded to memory location 204. Accordingly, comparator 406 provides a binary "1" as the control signal to multiplexer 404 such that multiplexer 404 provides the input data from stage 220 to stage 210 for processing. When the address of the output data from the memory location is not the same as the address of the input data from the second subsequent stage, comparator 406 provides a binary "0" as the control signal to multiplexer 404 such that multiplexer 404 provides the output data from memory location 204 to stage 210 for processing.

Figure 5:
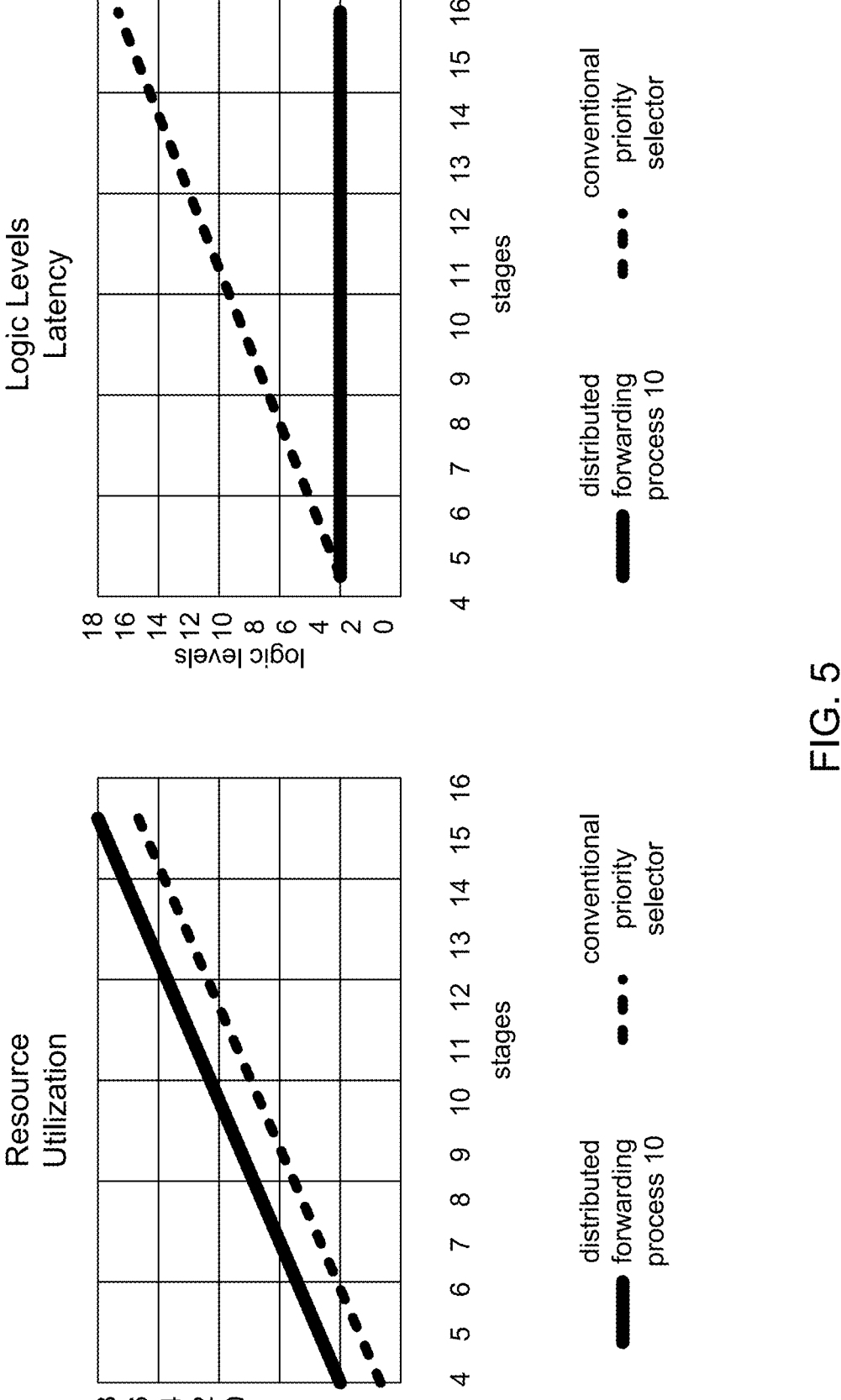
FIG. 5 depicts two graphs with resource utilization and logic level latency for the distributed forwarding process and a conventional priority selector.

Referring again to FIG. 4 and in some implementations, the resulting critical path for this approach comprises a single comparator and three multiplexers (as shown with the bold line in FIG. 4 between stage 220 and stage 210). This estimated latency equals approximately eight FPGA logic levels. When comparing distributed forwarding process 10 with previous solutions, the distributed data-forwarding results in less than half of the latency with only the additional cost of two extra address comparators and two additional multiplexers. This is a relative nominal price to pay for an approach that is scalable. For example, adding more stages between the memory location 204 and data modification stage 216, or adding more stages between data modification stage 216 and memory location 204 does not impact latency. However, doing so in the conventional solution worsens the latency with each additional stage. Referring also to FIG. 5, there are shown two graphs that compare distributed forwarding process 10 and conventional priority selector solutions. With five or more stages, it is shown that distributed forwarding process 10 provides no increase in logic level latency. With any number of stages, resource utilization for distributed forwarding process 10 is slightly higher than the conventional priority selector solution but with reduced latency.

Figure 6:
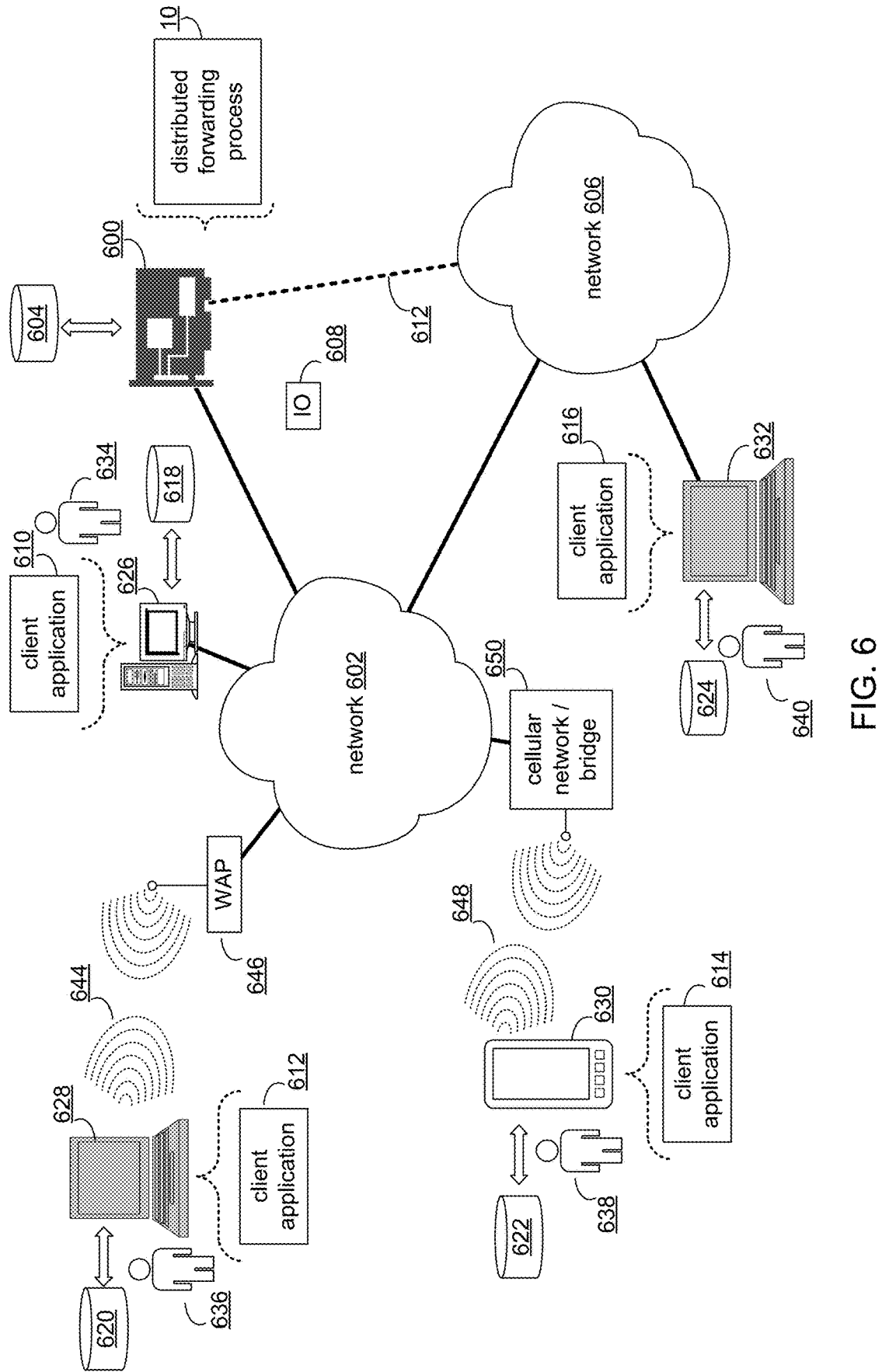
FIG. 6 is a diagrammatic view of computer system and the distributed forwarding process coupled to a distributed computing network.

System Overview:

Referring to FIG. 6, a distributed forwarding process 10 is shown to reside on and is executed by processor 600, which is connected to network 602 (e.g., the Internet or a local area network). Examples of processor 600 include: a field programmable gate array (FPGA) and an application-specific integrated circuit (ASIC).

The various components of processor 600 execute one or more operating systems, examples of which include: Microsoft® Windows®; Mac® OS X®; Red Hat® Linux®, Windows® Mobile, Chrome OS, Blackberry OS, Fire OS, or a custom operating system (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of distributed forwarding process 10, which are stored on storage device 604 included within processor 600, are executed by one or more processors (not shown) and one or more memory architectures (not shown) included within processor 600. Storage device 604 may include: a hard disk drive; an optical drive; a RAID device; a random-access memory (RAM); a read-only memory (ROM); and all forms of flash memory storage devices. Additionally or alternatively, some portions of the instruction sets and subroutines of distributed forwarding process 10 are stored on storage devices (and/or executed by processors and memory architectures) that are external to processor 600.

In some implementations, network 602 is connected to one or more secondary networks (e.g., network 606), examples of which include: a local area network; a wide area network; or an intranet.

Various input/output (IO) requests (e.g., IO request 608) are sent from client applications 610, 612, 614, 616 to processor 600. Examples of IO request 608 include data write requests (e.g., a request that content be written to processor 600) and data read requests (e.g., a request that content be read from processor 600).

The instruction sets and subroutines of client applications 610, 612, 614, 616, which may be stored on storage devices 618, 620, 622, 624 (respectively) coupled to client electronic devices 626, 628, 630, 632 (respectively), may be executed by one or more processors (not shown) and one or more memory architectures (not shown) incorporated into client electronic devices 626, 628, 630, 632 (respectively). Storage devices 618, 620, 622, 624 may include: hard disk drives; tape drives; optical drives; RAID devices; random access memories (RAM); read-only memories (ROM), and all forms of flash memory storage devices. Examples of client electronic devices 626, 628, 630, 632 include personal computer 626, laptop computer 628, smartphone 630, laptop computer 632, a server (not shown), a data-enabled, and a dedicated network device (not shown). Client electronic devices 626, 628, 630, 632 each execute an operating system.

Users 634, 636, 638, 640 may access processor 600 directly through network 602 or through secondary network 606. Further, processor 600 may be connected to network 602 through secondary network 606, as illustrated with link line 642.

The various client electronic devices may be directly or indirectly coupled to network 602 (or network 606). For example, personal computer 626 is shown directly coupled to network 602 via a hardwired network connection. Further, laptop computer 632 is shown directly coupled to network 606 via a hardwired network connection. Laptop computer 628 is shown wirelessly coupled to network 602 via wireless communication channel 644 established between laptop computer 628 and wireless access point (e.g., WAP) 646, which is shown directly coupled to network 602. WAP 646 may be, for example, an IEEE 802.11a, 802.11b, 802.11g, 802.11n, Wi-Fi®, and/or Bluetooth® device that is capable of establishing a wireless communication channel 644 between laptop computer 628 and WAP 646. Smartphone 630 is shown wirelessly coupled to network 602 via wireless communication channel 648 established between smartphone 630 and cellular network/bridge 650, which is shown directly coupled to network 602.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be used. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
processing data using a plurality of stages of a data processing pipeline;
identifying, based on a comparison of an input and an output of each stage of the plurality of stages, a data modification stage in the plurality of stages;
forwarding modified data from the data modification stage to each of the other stages of the plurality of stages, wherein each stage of the plurality of stages comprises selection logic to select between output data from a previous stage or the modified data from the data modification stage as input to an operator of the corresponding stage and wherein the modified data is provided as an input to the selection logic at each of the other stages;
at a respective stage in the plurality of stages, comparing an address of output data received from the previous stage relative to the respective stage with an address of the modified data;
in response to determining that the address of the output data from the previous stage is the same as the address of the modified data, selecting, using the selection logic, the modified data for processing in the respective stage; and
processing the modified data in the respective stage of the data processing pipeline.

2. The computer-implemented method of claim 1, wherein the data processing pipeline is executed using a field programmable gate array (FPGA).

3. The computer-implemented method of claim 1, wherein the data processing pipeline is executed using an application-specific integrated circuit (ASIC).

4. The computer-implemented method of claim 1, wherein processing the modified data in the respective stage of the data processing pipeline includes using the comparison of the address of the output data received from the previous stage with the address of the modified data as a control signal of a multiplexer to select an input signal for the respective stage.

5. The computer-implemented method of claim 4, wherein the input signal is one of the output data from the previous stage and the modified data.

6. The computer-implemented method of claim 1, wherein the data processing pipeline begins with reading the data from a memory location and ends with writing the modified data to the memory location.

7. The computer-implemented method of claim 6, further comprising:
identifying a first stage in the data processing pipeline;
identifying a first subsequent stage directly following the data modification stage;
forwarding input data from the first subsequent stage to the first stage;
comparing an address of output data received from the memory location with the address of the input data from the first subsequent stage; and
in response to determining that the address of the output data from the memory location is the same as the address of the input data from the first subsequent stage, processing the input data from the first subsequent stage in the first stage.

8. A computing system comprising:

a memory; and a computing device operatively coupled to the memory, the computing device configured to:

process data using a plurality of stages of a data processing pipeline;

identify, based on a comparison of an input and an output of each stage of the plurality of stages, a data modification stage in the plurality of stages;

forward modified data from the data modification stage to each of the other stages of the plurality of stages, wherein each stage of the plurality of stages comprises selection logic to select between output data from a previous stage or the modified data from the data modification stage as input to an operator of the corresponding stage and wherein the modified data is provided as an input to the selection logic at each of the other stages;

at each respective stage in the plurality of stages, compare an address of output data received from the previous stage relative to the respective stage with an address of the modified data;

in response to determining that the address of the output data from the previous stage is the same as the address of the modified data, select, using the selection logic, the modified data for processing in the respective stage; and process the modified data in the respective stage of the data processing pipeline.

9. The computing system of claim 8, wherein the data processing pipeline is executed using a Field Programmable Gate Array (FPGA).

10. The computing system of claim 8, wherein the data processing pipeline is executed using an application-specific integrated circuit (ASIC).

11. The computing system of claim 8, wherein processing the modified data in the respective stage of the data processing pipeline includes using the comparison of the address of the output data received from the previous stage with the address of the modified data as a control signal of a multiplexer to select an input signal for the respective stage.

12. The computing system of claim 11, wherein the input signal is one of the output data from the previous stage and the modified data.

13. The computing system of claim 8, wherein the data processing pipeline begins with reading the data from a memory location and ends with writing the modified data to the memory location.

14. The computing system of claim 13, wherein the computing device is further configured to:

identify a first stage in the data processing pipeline;

identify a first subsequent stage directly following the data modification stage;

forward input data from the first subsequent stage to the first stage;

compare an address of output data received from the memory location with the address of the input data from the first subsequent stage; and in response to determining that the address of the output data from the memory location is the same as the address of the input data from the first subsequent stage, process the input data from the first subsequent stage in the first stage.

15. A non-transitory computer readable medium having instructions stored thereon which, when executed by a processor, cause the processor to:

process data using a plurality of stages of a data processing pipeline executed using a Field Programmable Gate Array (FPGA);

identify, based on a comparison of an input and an output of each stage of the plurality of stages, a data modification stage in the plurality of stages;

forward modified data from the data modification stage to each of the other stages of the plurality of stages, wherein each stage of the plurality of stages comprises selection logic to select between output data from a previous stage or the modified data from the data modification stage as input to an operator of the corresponding stage and wherein the modified data is provided as an input to the selection logic at each of the other stages;

at each respective stage in the plurality of stages, compare an address of output data received from the previous stage relative to the respective stage with an address of the modified data;

in response to determining that the address of the output data from the previous stage is the same as the address of the modified data, select, using the selection logic, the modified data for processing in the respective stage; and process the modified data in the respective stage of the data processing pipeline.

16. The non-transitory computer readable medium of claim 15, wherein to process the modified data in the respective stage of the data processing pipeline the processor is further to use includes using the comparison of the address of the output data received from the previous stage with the address of the modified data as a control signal of a multiplexer to select an input signal for the respective stage.

17. The non-transitory computer readable medium of claim 16, wherein the input signal is one of the output data from the previous stage and the modified data.

18. The non-transitory computer readable medium of claim 15, wherein the data processing pipeline begins with reading the data from a memory location and ends with writing the modified data to the memory location.

19. The non-transitory computer readable medium of claim 18, wherein the processor is further configured to:

identify a first stage in the data processing pipeline;

identify a first subsequent stage directly following the data modification stage;

forward input data from the first subsequent stage to the first stage;

compare an address of output data received from the memory location with the address of the input data from the first subsequent stage; and in response to determining that the address of the output data from the memory location is the same as the address of the input data from the first subsequent stage, process the input data from the first subsequent stage in the first stage.

20. The non-transitory computer readable medium of claim 19, wherein the processor is further configured to:

identify a second subsequent stage directly following the first subsequent stage;

forward input data from the second subsequent stage to the first stage;

compare an address of output data received from the memory location with the address of the input data from the second subsequent stage; and in response to determining that the address of the output data from the memory location is the same as the address of the input data from the second subsequent stage, process the input data from the second subsequent stage in the first stage.

\* \* \* \* \*